United States Patent [19]

Davidson

[11] Patent Number: 4,714,929

[45] Date of Patent: Dec. 22, 1987

[54] DIGITAL AVERAGING FILTER PARTICULARLY SUITED FOR USE WITH AIR NAVIGATION RECEIVERS

[76] Inventor: Eldon F. Davidson, 240 Flower Dr., Folsom, Calif. 95630

[21] Appl. No.: 904,109

[22] Filed: Sep. 4, 1986

[51] Int. Cl.[4] .................. G01S 5/04; H03H 00/00; G06G 7/12; G01C 21/00

[52] U.S. Cl. ..................... 342/439; 364/572; 364/575; 364/734; 364/724; 340/976; 340/979; 324/83 D

[58] Field of Search ............... 364/572, 575, 724, 734; 340/979, 976; 324/83 D; 342/410, 439

[56] References Cited

U.S. PATENT DOCUMENTS

| | | | |
|---|---|---|---|
| 3,272,973 | 9/1966 | MacCready, Jr. | 364/572 |
| 3,272,974 | 9/1966 | MacCready, Jr. | 364/572 |
| 4,069,412 | 1/1978 | Foster et al. | 364/575 |
| 4,193,118 | 3/1980 | Nash et al. | 364/575 |
| 4,317,182 | 2/1982 | Takase et al. | 364/734 |
| 4,368,433 | 1/1983 | Imazeki et al. | 364/734 |

Primary Examiner—Theodore M. Blum
Assistant Examiner—David Cain
Attorney, Agent, or Firm—Stanger, Michaelson, Reynolds, Spivak & Tobia

[57] ABSTRACT

Apparatus for a digital averaging filter, particularly suited for use with an aeronautical navigation receiver, for reducing oscillatory deviation errors that appear in a course deviation voltage produced by the receiver and occur as the result of reflected incoming radio-navigation signals and/or interfering signals as described. In essence, this apparatus first amplifies, filters and repetitively samples the course deviation voltage to provide digital representations thereof. Each digital representation is then converted by a digital to pulse count converter into a series of pulses wherein the value of each digital representation is encoded into the number of pulses in the series. Thereafter, these pulses are totalized over a pre-defined interval. The resulting totalized count is then divided to produce an average value, which at the end of the pre-defined interval accurately reflects the average course deviation error. Advantageously, this average value is substantially free of any oscillatory deviation errors. This average value is then converted to an equivalent analog value for eventual display on a course deviation indicator.

18 Claims, 6 Drawing Figures

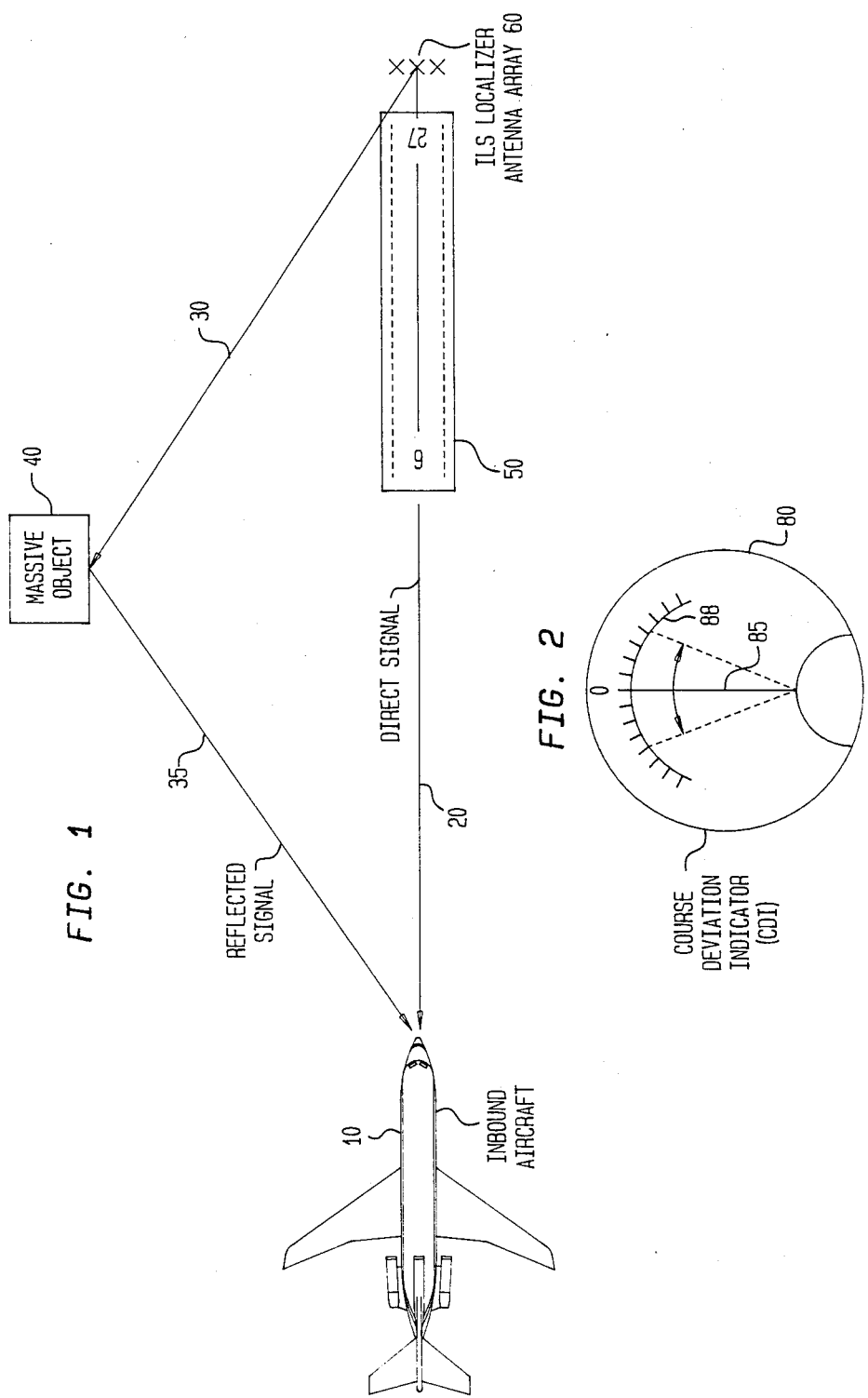

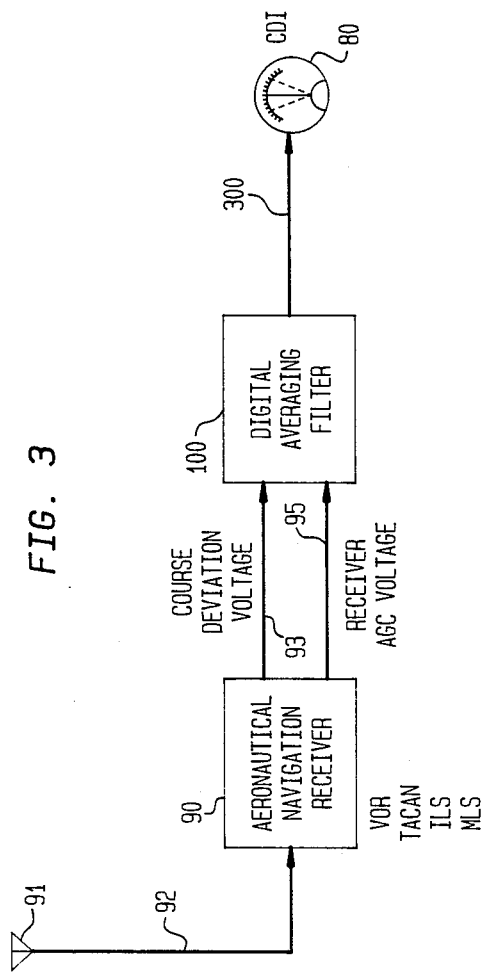

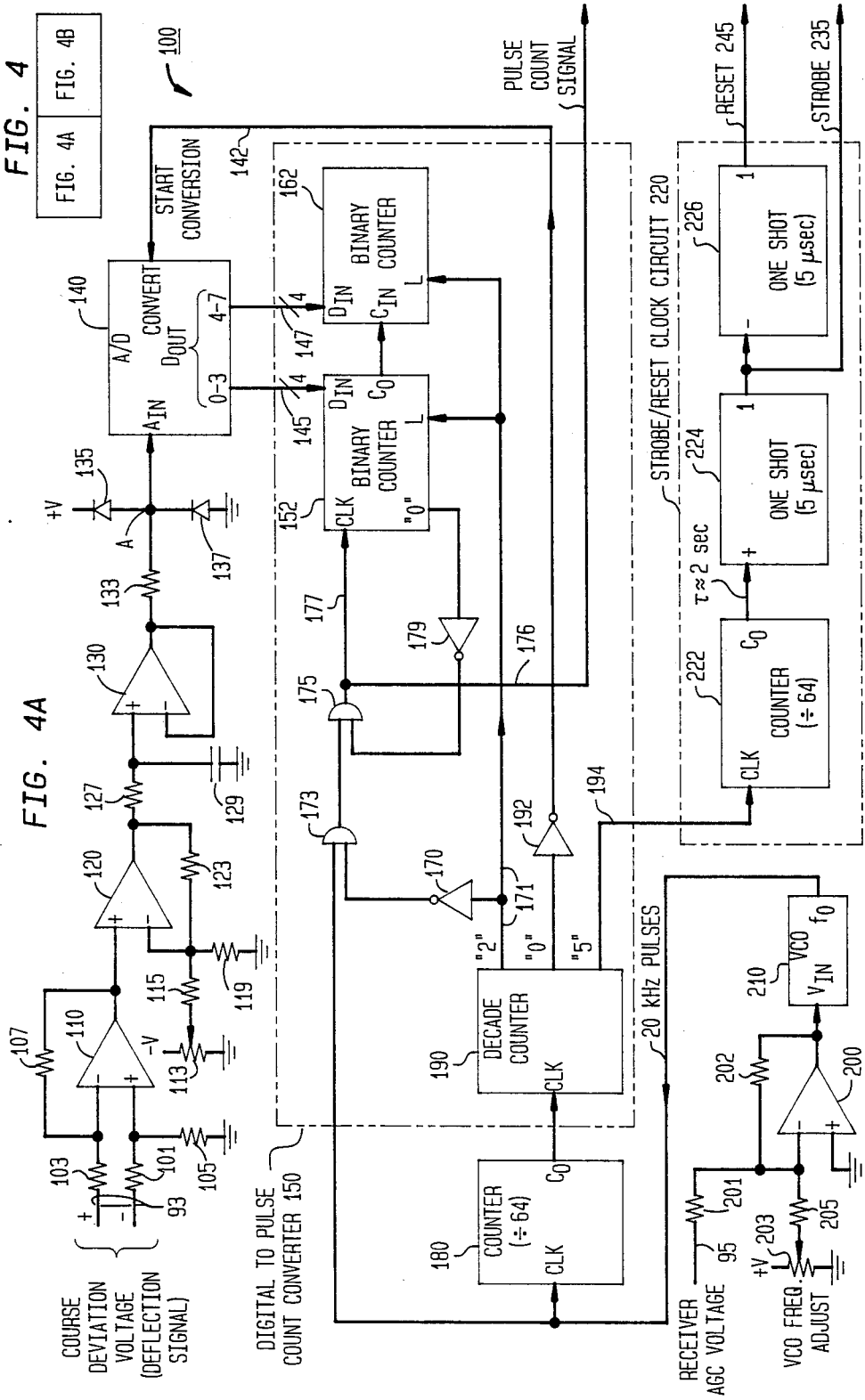

DIGITAL AVERAGING FILTER PARTICULARLY SUITED FOR USE WITH AIR NAVIGATION RECEIVERS

BACKGROUND OF THE INVENTION

1. Field of the Invention

The invention relates to apparatus for a digital averaging filter, particularly suited for use with aeronautical navigation receivers, for reducing oscillatory deviation errors that occur as the result of reflected incoming radio-navigation signals and/or interfering radio signals.

2. Description of the Prior Art

Currently, a number of different aeronautical radio-navigation systems are in use for enabling a pilot to place his aircraft on a pre-selected path to or from a ground based radio-navigation facility. These systems include both enroute aids, such as very high frequency omnirange (VOR) and TACAN receivers, and landing aids, such as instrument landing system (ILS) and microwave landing system (MLS) receivers.

Enroute aids permit the pilot to fly a direct course to or from a fixed location on the ground. However, an enroute aid, being designed for relatively long distance navigation, only provides the pilot with information that indicates whether the aircraft is heading in a horizontal direction that deviates from a selected course heading to or from a pre-selected ground location, which is usually the location of the transmitter of the enroute aid. As such, enroute aids provide no vertical guidance information. Nonetheless, VOR and TACAN receivers are usually able to successfully guide an aircraft within one or two degrees of the selected course.

Landing aids permit the pilot to fly his aircraft on a proper inbound course and at the right angle of descent to the centerline of an appropriately instrumented runway. As contrasted with enroute aids, landing aids provide both horizontal and vertical guidance information. Here, horizontal guidance information is provided which indicates whether the aircraft is heading in a direction that horizontally deviates to the left or right of a selected inbound course to the runway. In addition, vertical guidance information is provided which indicates whether the aircraft is located above or below a selected inbound glide path extending diagonally outward and upward from a far end of the instrumented runway. Landing aids are generally able to horizontally guide an aircraft to within 30 to 40 feet of the centerline of the runway and vertically guide that aircraft to within 6 to 10 feet of the proper height above the runway threshold.

Deviation information (both course and glide slope) is frequently displayed on zero center deviation meters (commonly referred to as course deviation meters or CDIs) or the like and is also usually fed as an input signal to appropriate automatic navigation (auto-pilot) systems existing onboard the aircraft. In the absence of any interference, radio-navigation aids are quite accurate as noted above.

Unfortunately, these radio-navigation aids are quite susceptible to interference which adversely affects their accuracy. One common cause of interference is reflections. Specifically, radio-navigation signals reflect off objects such as bridges, buildings, power lines, trees, bodies of water, rough terrain and the like. Consequently, radio-navigation signals will arrive at the antenna of the aircraft receiver via two basic paths: signals that directly emanate from the transmitter of the radio-navigation aid and impinge on the antenna, and signals that emanate from the transmitter but reflect off an object before arriving at the antenna. Since a reflected signal always travels via a longer path to the antenna of an aeronautical receiver than a direct signal, a reflected signal arrives at the antenna with a different phase than that the direct signal. Inasmuch as the direct and reflected signals appearing at the antenna combine by vector addition, the reflected signal corrupts the direct signals and injects an erroneous deviation error into the reading produced by the receiver. This error is commonly referred to as "multi-path" error.

To complicate matters, as the aircraft moves along its course, the path length of the reflected signals changes which, in turn, changes the relative phase difference between the direct and reflected signals arriving at the antenna. This, in turn, causes the deviation reading to oscillate back and forth. These oscillations can typically occur with a period ranging between 0.5 seconds to several minutes (although rarely in excess of two seconds) depending on the speed of the aircraft; the angle subtended by the reflecting object and the aircraft with respect to the antenna of the radio-navigation transmitter; the distances between the antenna, the aircraft and the reflecting object; and several other factors.

Disadvantageously, almost every locality contains objects which reflect radio-navigation signals. Inasmuch as these objects are essentially randomly distributed throughout an area, a deviation reading seldom oscillates with a steady period and seldom with exactly the same amplitude on either side of the zero reading. Consequently, experienced pilots generally ignore any rapid excursions in deviation information and instead take corrective action only when they perceive that the average deviation reading is non-zero. Unfortunately, this requires that a pilot constantly watch a CDI needle over a period of time during which he mentally estimates an average reading to yield an assessment of true course deviation. This task is quite burdensome on the pilot and hence quite tiring. Moreover, such mental estimations are often inaccurate.

Not only are radio-navigation signals reflected from ground based objects, these signals are also reflected from other aircraft. Multipath errors due to aircraft reflections are becoming more prevalent as airports become more congested particularly with large aircraft. The Federal Aviation Administration (FAA) requires that a set amount of space must exist between any two aircraft, particularly those inbound to an ILS equipped runway, such that a landing aircraft is well clear of the runway and ground navigation transmitters before another aircraft is allowed to make an ILS approach. As a result of this spacing, aircraft induced oscillatory multipath errors usually possess a relatively short period. However, because these errors are quite unpredictable, they can cause erratic operation of an airborne automatic navigation system as it undertakes an automatic ILS approach. In fact, aircraft induced multipath errors have been known to cause an automatic navigation system to disadvantageously disconnect during an ILS approach. Unfortunately, glide path receivers are particular sensitive to these multipath errors.

Moreover, the frequency band of VOR radio navigation aids (108–118 mHz) lies between that of the FM broadcast band (88–108 mHz) and 2 meter amateur radio band (144–148 mHz). In particular, VOR transmitters operate on 40 channels spaced 50 kHz apart within the band 108-112 mHz and on 120 channels also spaced 50 kHz apart between 112-118 mHz. In addition, VOR transmitters have a relatively low output power, typically 25-200 watts. As such, strong radio signals often exist that locally interfere with VOR signals. This interference, when it occurs, disadvantageously produces erroneous oscillatory deviation errors. The period of such interference induced oscillations generally falls within the same range as that of reflection induced oscillations. The length of this period depends upon many factors, such as the strength of the interfering signal, the difference in frequency between the interfering signal and the particular VOR station then being received, the proximity of the aircraft to the location of the interfering transmitter and the course, speed and altitude of the aircraft relative to the transmitter location. Consequently, the pilot must also be able to recognize and then ignore erroneous oscillatory deviation errors caused by radio interference in addition to those produced by reflections.

Therefore, a need exists in the art for apparatus particularly suited for use in conjunction with aeronautical navigation receivers for reducing oscillatory deviation errors that occur as the result of reflected incoming radio-navigation signals and interfering radio signals.

SUMMARY OF THE INVENTION

Accordingly, an object of the present invention is to provide a filter, for use with an aeronautical navigation receiver, for substantially eliminating errors in course and glide slope deviation readings resulting from reflections of a radio-navigation signal, either caused by a ground based object or an aircraft.

Another object is to provide such a filter which substantially eliminates erroneous deviation readings caused by interfering radio signals.

An additional object is to advantageously eliminate an activity that is tedious and tiring to the pilot.

A particular object is to eliminate the need for a pilot to mentally average course deviation readings appearing on a CDI in order to yield an accurate assessment of true course deviation.

A more particular object is to provide such a filter which substantially eliminates erroneous oscillatory deviation errors appearing in these deviation readings.

These and other objects are achieved in conjunction with the teachings of the present invention by apparatus which includes an analog-to-digital converter that samples an incoming course deviation voltage to yield corresponding digital signal representations thereof; an accumulator that adds the digital signal representations that occur during a pre-defined time period to form a totalized value; a divider that calculates an average value in response to the totalized value whenever the pre-defined period has elapsed; and finally a digital-to-analog converter that converts the average value to a form suitable for display on a course deviation meter, wherein the average value is substantially free of any oscillatory error components.

In accordance with a particular embodiment of the invention, the digital filter includes circuitry which first amplifies, filters and repetitively samples the course deviation voltage to provide digital representations thereof. Thereafter, each digital representation is then converted by a digital to pulse count converter into a series of pulses wherein the value of each digital representation is encoded into the number of pulses in a corresponding series. This process is repeated at an approximate frequency of 32 Hz. Then, all the individual pulses that appear in all the pulse series during a pre-defined time period, illustratively and approximately two seconds, are totalized. The resulting totalized count is then divided to produce an average value, which at the end of the same two second period accurately reflects the average course deviation error. Advantageously, this average value is substantially free of any oscillatory deviation errors. This average value is then converted to an equivalent analog value for eventual display on a course deviation indicator.

BRIEF DESCRIPTION OF THE DRAWING

The teachings of the present invention may be clearly understood by considering the following detailed description in conjunction with the accompanying drawing, in which:

FIG. 1 is a diagram which shows multi-path error that often occurs as an aircraft approaches a runway having an instrument landing system (ILS);

FIG. 2 shows an oscillatory deviation error induced by the reflected signal shown in FIG. 1 and as displayed by a course deviation indicator (CDI);

FIG. 3 is a block diagram which shows the interconnection of a typical aeronautical navigation receiver to a digital averaging filter that embodies the teachings of the present invention;

FIG. 4 shows the proper alignment of the drawing sheets for FIGS. 4A and 4B; and FIGS. 4A and 4B together depict a schematic diagram of a preferred embodiment of the inventive digital averaging filter shown in FIG. 3.

To facilitate understanding, identical reference numerals have been used to denote identical elements that are common to the figures.

DETAILED DESCRIPTION

Figure 4B:
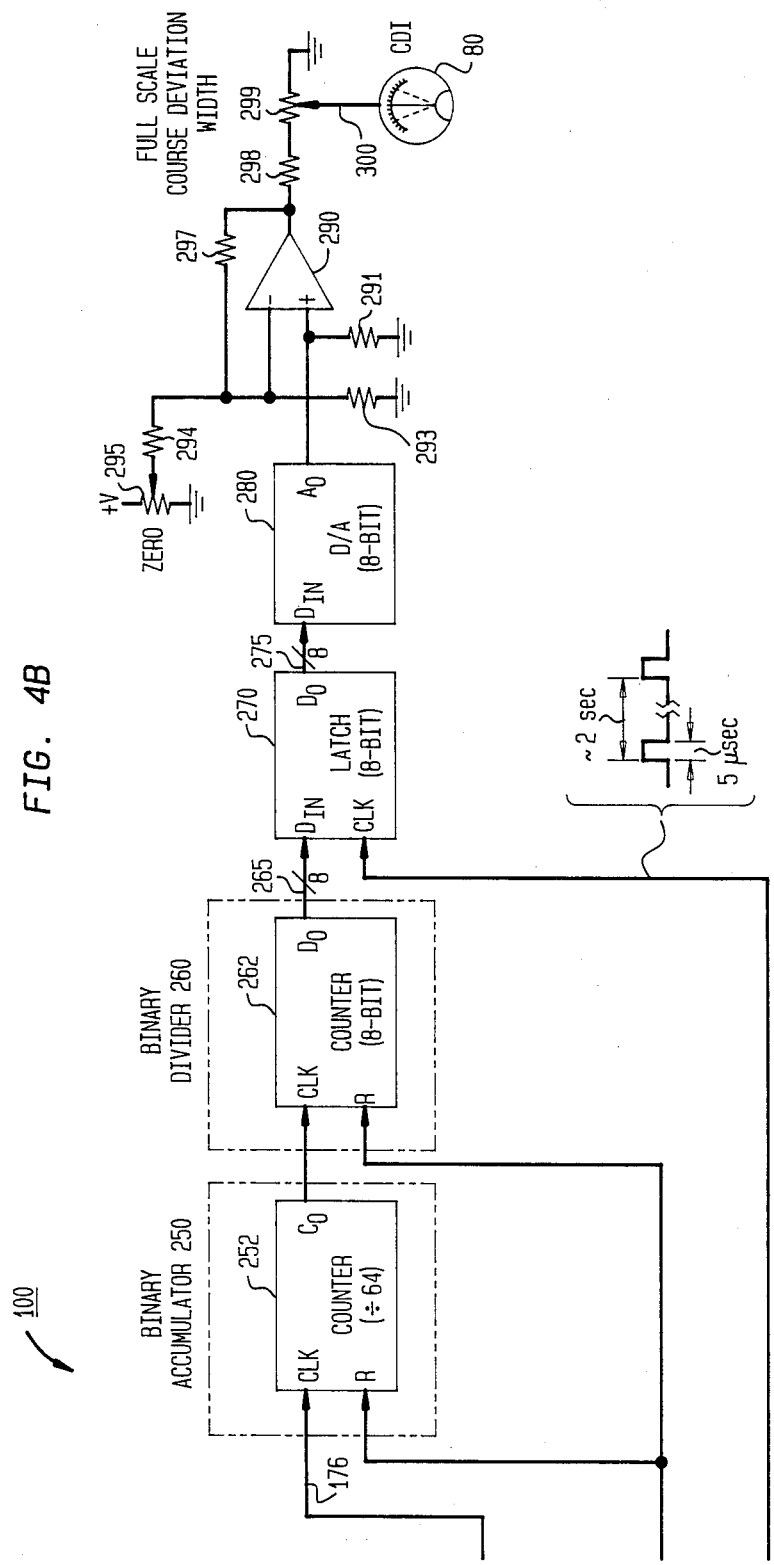

The teachings of the present invention are applicable to any aeronautical navigation receiver that produces a zero center course deviation error. These receivers illustratively include those which provide horizontal (lateral) guidance information such as Very High Frequency Omnirange (VOR) and localizer receivers (used in Instrument Landing Systems—ILS, or Microwave Landing Systems—MLS) and those which provide vertical guidance information, such as glide slope receivers (used in either ILS or MLS systems). Generally, this guidance information is displayed on a zero center course deviation meter (CDI) or the like. For purposes of illustration, the present invention will be discussed in conjunction with a localizer receiver. Clearly after reading the following discussion, these skilled in the art will readily appreciate the manner in which the present invention can be used in conjunction with other aeronautical navigation receivers.

At this point, a full understanding of the present invention can be gained by first considering the problem to which the invention is directed.

FIG. 1 diagrammatically depicts aircraft 10 as it approaches runway 50 which is equipped with an instrument landing system (ILS). Here, the localizer, which forms part of the ILS, transmits a signal having approximately 25 watts of output power on a pre-determined one of 40 separate channels spaced 50 kHz apart within the band 108-112 mHz. This signal is radiated by ILS localizer antenna array 60 locataed at the far end of runway 50. This array produces a pre-defined transmission pattern (well known and not shown) that provides an outwardly directed equisignal course oriented along the centerline of the runway. The left-hand portion of the pattern is amplitude modulated by a 90 Hz tone, and the right hand portion is amplitude modulated by a 150 Hz tone. In operation, the localizer receiver on board the aircraft detects these tones, rectifies them and presents a left-right display on a zero center DC meter (a course deviation meter - CDI) to indicate whether the aircraft, as it approaches the approach end of the runway, is deviating either to the right or left of both the equisignal course and ultimately the runway centerline. Although a localizer uses line-of-sight frequencies and is substantially free of any atmospheric and sky-wave affects, localizer signals are adversely subject to site conditions, as discussed below.

For maximum navigational accuracy approaching ±0.1 degree, direct signal 20 which emanates from ILS localizer antenna array 60 should be the only signal that reaches the aircraft from the antenna array. Unfortunately, this is rarely true in practice. In particular, localizer signals, such as signal 30, emanate from the side of the transmission pattern produced by antenna array 60. These signals may strike a massive object, such as object 40 located close to the runway, which, in turn, reflects these signals to produce signal 35 that travels towards the aircraft. Bridges, buildings, pronounced hills, electrical towers and the like are some examples of massive objects that reflect localizer signals. These signals are also reflected by other airborne aircraft that operate in the vicinity of the localizer transmitter.

Consequently, two localizer signals impinge upon the antenna of the localizer receiver on board aircraft 10: direct signal 20 and reflected signal 35. Inasmuch as a reflected signal always travels a greater path length than a direct signal, a phase difference exists between direct signal 20 and reflected signal 35 at the instant both arrive at the localizer antenna located on aircraft 10. The direct and reflected signals appearing at this antenna combine by vector addition to produce a composite received localizer signal having an erroneous phase component. When rectified, this erroneous phase component produces an erroneous amplitude which, in turn, injects an erroneous deviation error into the reading produced by the receiver and indicated on the CDI. This error is commonly referred to as "multi-path" error.

To complicate matters, as aircraft 10 moves along its inbound course, the path length of reflected signal 35 changes which, in turn, changes the relative phase difference between the direct and reflected signals arriving at the localizer antenna onboard the aircraft. This, in turn, causes the deviation reading to oscillate back and forth, as shown in FIG. 2 which depicts CDI 80. The oscillations in the movement of meter needle 85 can typically occur with a period ranging between 0.5 seconds to several minutes (although rarely in excess of two seconds) depending on the speed of aircraft 10; the angle subtended by object 40 and aircraft 10 with respect to localizer antenna array 60; the distances between the antenna, the aircraft and the object 40; and several other factors. Since there are usually many objects which reflect transmitted localizer signals, course deviation readings will seldom oscillate with a steady period and rarely with exactly the same deviation to either side of zero on scale 88, as illustratively shown in FIG. 2. Multipath reception can also be caused by localizer signals that have been reflected off other aircraft.

Similar oscillatory errors, to those produced by multi-path reception, can be introduced into the course deviation reading appearing on CDI 80 by interfering signals produced by high power radio transmitters (e.g. FM broadcast and amateur radio) which operate on frequencies situated close to those used by the localizer. Experienced pilots learn to mentally average these oscillations, over time, to yield an average course deviation reading indicative of a true course deviation from the centerline of the approach end of the runway. Unfortunately, this mental activity is tedious and fatiguing, and often yields inaccurate results.

These deficiencies inherent in aeronautical radio-navigation systems are advantageously eliminated in accordance with the teachings of the present invention by use of a digital averaging filter which is interconnected between the output of the navigation receiver and the input to a CDI, and which substantially reduces oscillatory deviation errors that occur as the result of reflected incoming radio-navigation signals and/or interfering radio signals. In particular, this filter computes the average value of the course deviation error that occurs during a pre-defined period. Since this period is longer, illustratively on the order of 2 seconds, than the period of substantially all of these oscillatory errors, the oscillatory errors are substantially eliminated from the resulting average value. This average value is displayed on a CDI and fed, if desired, as input to other navigation systems, such as an automatic navigation (auto-pilot) system.

FIG. 3 shows, in block diagram form, the manner in which a typical aeronautical navigation receiver is interconnected to a digital averaging filter constructed in accordance with the teachings of the present invention.

Here, aeronautical receiver 90 is situated on board an aircraft, such as aircraft 10 (see FIG. 1). Antenna 91, which appears in FIG. 3, is affixed to the outside skin of the aircraft. Radio-navigation signals impinge onto the antenna and are, from there, routed, via lead 92, to an input of aeronautical navigation receiver 90. Although, as noted, the inventive system will be specifically described in conjunction with a localizer receiver for an ILS, this receiver can alternatively be an ILS glide slope receiver, an MLS localizer or glide slope receiver, a VOR receiver or a TACAN receiver. Such receivers are well known in the art. In any event, receiver 90 produces two output signals: a zero center dc voltage representing course deviation error and a well known automatic gain control (agc) signal on leads 93 and 95, respectively. Both of these signals are applied as input to digital averaging filter 100. This filter advantageously eliminates oscillatory error components from the course deviation voltage and, by doing so, provides an average value of deviation error. The resulting signal produced by filter 100 is applied, via lead 300, as input to CDI 80, which is typically a zero center dc meter. The CDI indicates the average course deviation error on a zero center basis.

Now, with the foregoing overall description in mind, FIGS. 4A and 4B—for which the proper alignment of the respective drawing sheets is shown in FIG. 4—schematically depict the circuitry for a preferred embodiment of digital averaging filter 100 shown in FIG. 3. In essence, as shown in FIGS. 4A and 4B, this circuit first amplifies, filters and repetitively samples the course deviation voltage to provide digital representations thereof. Each digital representation is then converted by digital to pulse count converter 150 into a series of pulses wherein the value of each digital representation is encoded into the number of pulses appearing in the series. Thirty two separate pulse series occur per second. Thereafter, all pulses occurring in all the series are accumulated (totalized) over a two second interval by binary accumulator 250. The resulting accumulated (totalized) count is then divided by binary divider 260 to produce an average value, that is updated every two seconds, for subsequent conversion to an equivalent analog value and eventual display on CDI 80. Strobe/reset clock circuit 220 produces strobe and reset pulses at two second intervals, as discussed in detail below.

As depicted in FIGS. 4A and 4B, the course deviation voltage produced by navigation receiver 90 is differentially applied to filter 100, via leads 93. Within the filter, the course deviation voltage is applied as input to operational amplifier 110. From there, the resulting amplified signal is applied to the non-inverting input to operational amplifier 120. Together amplifiers 110 and 120 amplify the low-level differential course deviation voltage appearing over leads 93 to a 0-5 volt level. A negative reference dc voltage provided by potentiometer 113 is applied through resistor 115 to the inverting input to amplifier 120. This potentiometer is appropriately adjusted such that zero valued course deviation voltage provides a 2.5 volt signal at point A (the analog input to analog/digital converter 140, as discussed below). The gain of amplifiers 110 and 120 is established by proper selection of the values of resistors 101, 103, 105, 107, 115, 119 and 123. The value of potentiometer 113 is not critical.

The 0-5 volt output signal produced by amplifier 120 is applied through a low pass filter consisting of resistor 127 and 129. The values of resistor 127 and capacitor 129 are selected, illustratively 100 kohms and 1 µf, respectively, to provide a filter, with a sufficiently low cut off frequency, here illustratively 10 Hz, that effectively removes any residual navigation tones (90 or 150 Hz) from the amplified signal produced by amplifier 120. The output of this filter is applied through non-inverting buffer 130 to the analog input of analog digital (A/D) converter 140, via a voltage limiting circuit consisting of resistor 133 and diodes 135 and 137. This limiter ensures that the analog voltage applied as input to A/D converter 140 remains within the 0-5 volt range. This converter produces a 8-bit digital word having a binary value that is proportional to the 0-5 volt signal applied thereto. For example, given either a 0 or 5 volt input signal, the converter produces a digital word having the value 0 or 255, respectively. As discussed below, the converter initiates an analog-to-digital conversion each time a pulse is applied to its CONVERT input, via start conversion lead 142. The upper and lower order four bits of the eight bit parallel word produced by A/D converter 140 are applied, in parallel via leads 145 and 147, as input to respective four bit counters 152 and 162.

Whenever aircraft 10 (shown in FIG. 1) is on course, the course deviation voltage appearing on input leads 93 (assuming no oscillatory deviation error components exist) depicted in FIG. 4A is zero. As a result and as discussed above, a 2.5 volt dc level is applied to the analog input, $A_{in}$, of the A/D converter. The converter produces the binary value "128" at its digital output which, in turn, is applied to the data inputs, $D_{in}$, of cascaded binary counters 152 and 162, as discussed below.

Now, at the same time, voltage controlled oscillator (VCO) 210 is producing a steady stream of 20 kHz clock pulses. These pulses serve as the base clock for the filter 100. The frequency of these pulses is controlled by an analog voltage applied to input $V_{in}$ of the VCO. This voltage is produced by amplifier 200 which, itself, amplifies the difference between a fixed reference voltage provided by potentiometer 203 and the receiver agc voltage appearing on lead 95, as discussed below. With a 150 microvolt signal applied to the input of aeronautical receiver 90 (see FIG. 3), potentiometer 203 is adjusted such that VCO 210 produces a 20 kHz pulse train. This 150 micro-volt level is equivalent to the received signal strength of a transmitted localizer signal existing at a distance of 16 miles from the localizer transmitter. As the aircraft approaches the localizer transmitter, the magnitude of the receiver agc voltage increases, which, in turn, causes the output frequency of the VCO to increase as well, all as discussed in detail below.

Filter 100 utilizes several timing signals that are all related to the 20 kHz base clock. In particular, the signal produced by VCO 210 is first counted down by 64 by binary counter 180, and thereafter the resulting count is itself counted down by 10 by decade counter 190. Each state of the decade counter is separately decoded and is available as an output. The "0", "2" and "5" outputs are used in this embodiment. Specifically, every time a zero state occurs in counter 190 a pulse appears at the "0" output of this counter. Inasmuch as counters 180 and 190 together divide the 20 kHz clock frequency by 640, pulses appear on the "0" output of counter 190 at a frequency of approximately 32 Hz. Each of these pulses is applied to inverter 192 which inverts its state and, from there, applies the resulting inverted pulse, via lead 142, to the CONVERT input of A/D converter 140 to initiate an analog-to-digital conversion. As such, A/D conversions occur at the rate of 32 Hz.

As noted above, digital to pulse count converter 150 converts every digital value produced by A/D converter 140, and appearing on leads 145 and 147, into a series of 20 kHz clock pulses that appear on PULSE COUNT SIGNAL lead 176. Each digital value defines the number of pulses (pulse count) that occurs in a corresponding series. This conversion occurs every 31.25 milliseconds (i.e. at a rate of approximately 32 Hz) to produce 32 separate series of pulses per second on lead 176. Converter 150 functions in the following manner. First, assume the the count stored in counters 152 and 162 is zero. Now, with zero stored within these two counters, a high level occurs at the "0" output of counter 152. This high level is inverted by inverter 179. The resulting low level produced by this inverter is applied as one input to AND gate 175 to inhibit any 20 kHz pulses from propagating through this gate to the clock input of counter 152. Now, when the count in counter 190 advances by two (i.e. after 128 20 kHz clock pulses have occurred), a pulse appears on the "2" output which, in turn, is applied, via lead 171, as an input to inverter 170 and also to the load input of counters 152 and 162. As a result, this inverter produces a negative going pulse which is applied to one input of AND gate 173 in order to inhibit any 20 kHz clock pulses from propagating therethrough. At the same time, the positive pulse appearing on lead 171 causes the binary number produced by A/D converter 140 (illustratively having the value "128" for a zero course deviation error), and appearing on leads 145 and 147 and applied to the data inputs to counters 152 and 162, to be loaded into these two counters. Once this happens, the "0" output of counter 152 goes low, which, in turn, via the inversion produced by inverter 179, enables AND gate 175. The next clock pulse applied to counter 190 causes this counter to advance its count from "2" to "3" which results in the level appearing at the "2" output returning to a low state. This low level, when inverted by inverter 170, enables AND gate 173. Inasmuch as AND gates 173 and 175 are now enabled, 20 kHz clock pulses produced by VCO 210 are gated through these gates to the clock input of counter 152. These 20 kHz clock pulses produced by the VCO successively decrement the count (illustratively starting at the value "128") existing in counters 152 and 162 to zero. Once this count reaches zero, the "0" output of counter 152 goes positive once again to temporarily inhibit, via AND gate 175, the application of any further clock pulses to counter 152. The same 20 kHz clock pulses used to decrement counters 152 and 162 are also applied to PULSE COUNT SIGNAL lead 176. Thus, the signal appearing on this lead contains successively occurring series of 20 kHz pulses. Individual pulse series are produced at a frequency of 32 Hz. The digital number (0-255) produced by A/D converter 140 specifies the exact number of pulses (0-255) that occurs in a corresponding individual series of pulses.

The pulses appearing on PULSE COUNT SIGNAL lead 176 are used to increment the count stored in binary accumulator 250, which itself consists of 6-bit binary counter 252. This accumulator continually accumulates (totalizes) the pulses appearing on lead 176 over a pre-defined period of time, here approximately 2 seconds, that is advantageously longer than the expected maximum period of a typical oscillatory deviation error signal. During this period, 64 separate pulse series will have been generated by converter 150, applied to lead 176 and totalized by counter 252. The totalized count stored in counter 252 is then averaged over the same period by binary divider 260. In particular, the pulses clocked out of counter 252 are applied to the clock input of 8-bit binary counter 262, located within divider 260, to successively increment the contents of this latter counter. The contents of counter 262 equal the remainder of the total number of pulses clocked out of counter 252 divided by the value "256". Since counters 252 and 262 each successively divides the 20 kHz clock pulses by 64, then after illustratively 128 pulses have been applied to the clock input of counter 252, the contents of counter 262 have been incremented to the value "2". The contents of counter 262 are applied, in parallel, via leads 265, to the input of 8-bit latch 270. These contents are strobed into latch 270 approximately every 2 seconds by a strobe pulse appearing on lead 235. After the strobe pulse occurs, the contents of accumulator 250 and divider 260 are both reset to zero by a reset pulse appearing on lead 245. Inasmuch as the contents of counter 262 are read in parallel at the end of the same approximately 2 second interval during which accumulator 250 is totalizing, the contents in divider 260 equals the average value of the number of pulses that have occurred in all of the series of pulses that have appeared on lead 176 during this period. Consequently, the average value stored in divider 260 accurately represents the average value of the course deviation voltage occurring during this period.

The value stored in latch 270 is transferred to the parallel input of D/A converter 280, which for a zero valued deviation voltage produces a half scale error signal of 2.5 volts. The output of this converter is buffered by amplifier 290 and then applied through resistor 298 and potentiometer 299, and finally, via lead 300, to CDI 80. With a zero course deviation voltage appearing on leads 93, potentiometer 295 is adjusted to ensure that CDI 80 reads zero. alternatively, when a test signal is injected into localizer receiver 90 (see FIG. 3) that produces a full scale course deflection voltage, potentiometer 300 is suitably adjusted to provide a full scale deflection on CDI 80. The values of resistors 291, 293, 294 and 297 are not critical and are suitably selected to set the gain for amplifier 290 to an appropriate value. The value of resistors 298 and potentiometer 299 are not critical but depend upon the full scale current required to drive CDI 80 to its maximum reading.

Strobe/reset clock circuit 220, in conjunction with decade counter 190, generates the 5 microsecond strobe and reset pulses each having an approximately 2 second period. To provide these pulses, a pulse produced by one of the decoded states, illustratively the "5" state of counter 190, is applied, via lead 194, as an input to binary counter 222. This counter divides the approximately 32 Hz pulses appearing on this lead by 64 to yield one pulse that occurs approximately every 2 seconds. The leading edge of this 2 second pulse triggers one shot (monostable multivibrator) 224 to produce a pulse that is illustratively 5 microseconds in width. This 5 microsecond pulse is applied as the strobe pulse to lead 235. Five microseconds later, the falling edge of the strobe pulse triggers one shot 226 which itself also produces a 5 microsecond pulse that is applied as the reset pulse to lead 245. Now, after the count in counter 190 is incremented by five, i.e. from the value "5" back to the value "0", the above process is repeated.

Now, as discussed, A/D converter 140 samples its analog input voltage approximately 32 times a second and produces a binary value that is proportional to the instantaneous value of this analog voltage. As noted, if 2.5 volts (occurs with zero course deviation voltage) is applied as the analog input voltage to the A/D converter, this converter will produce the binary value "128"0 and 128 pulses will form each series of pulses that appears on PULSE COUNT SIGNAL lead 176. Similarly, if 3.75 volts (occurs with a positive deviation error, i.e. a fly right condition) is applied as the analog input voltage, then the converter will produce the value "192" and 192 pulses will form each series of pulses appearing on lead 176. Alternatively, if the analog input voltage decreased to 1.25 volts (occurs with a negative deviation input voltage, i.e. a fly left condition), then the converter will produce the value "64" and only 64 pulses will appear in each series of pulses. Now, over an approximate two second period, the analog input voltage applied to this converter would be sampled approximately 64 times (in actuality 2 ×20 kHz/640). If the course deviation voltage and hence the analog input voltage applied to the A/D converter contained an oscillatory error component having a period less than 2 seconds, such as multipath error, while the true course deviation remained at zero, then the number of times the value produced by this converter increased above and decreased below the value "128" would remain equal. Similarly, over this period, the pulse count of each series of pulses would increase above and decrease below the value "128"; however, the average value of the pulse count for all the series would remain at the value "128". As such, at the end of this two second period, the value contained in counter 262 would equal the value "128". This value, when applied via leads 275 to the input of D/A 280, will produce a steady zero indication on CDI 80. Alternatively, if aircraft 10 (see FIG. 1) drifts off course, then the course deviation voltage appearing on leads 93 (see FIG. 4A) will be non-zero. In this case, the multipath error will oscillate about a non-zero deviation signal. Hence, the average value of the signal applied to the analog input of A/D converter 140 will become non-zero as this signal tracks the non-zero average value of the course deviation signal. Likewise, as evident from the above discussion, the average pulse count of the pulses appearing on lead 176 and the value of the binary number produced by counter 262 will also change as well as both track the average value of the course deviation signal occurring over the approximately two second period. Hence, amplifier 290 will produce an output signal that will result in either a correct fly left or right indication on CDI 80. In practice, the inventive digital averaging filter will substantially reduce, to near zero, any oscillating error signal, having a period of approximately 2 seconds or less, from the reading produced by CDI 80. Lesser reductions occur for multipath and other oscillatory error signals that have a period greater than approximately 2 seconds. Specifically, with the clock rates shown, as oscillatory error signal with a period of approximately 4 or 8 seconds will be reduced by approximately 50% or 25%, respectively, before being displayed on CDI 80. The clock rates used in the inventive circuit are not critical. However, to provide accurate results as just discussed, the period over which the accumulating operation occurs and the same period which must elapse between successive averaging operations should be longer than the maximum expected period of the oscillatory error signals. Satisfactory performance occurs if the clock rates are such that A/D converter 140 provides a new conversion at the rate of between 30 and 75 Hz. Higher clock rates can also be used if desired. Clearly, if higher clock rates are used, then the size of the counters might need to be appropriately increased in order to allow a large number of pulses to be totalized over a sufficiently long period of time, such as two seconds.

Now, as the aircraft approaches the runway threshold, and hence the distance between the aircraft and the threshold decreases, the time for the course deviation error to reach a full scale reading also decreases. As such, the course deviation signal must be sampled at an increasingly rapid rate. During the approach to the runway, the aircraft is also approaching the localizer transmitter. Consequently, the signal strength of the received localizer signal also increases. Therefore, to increase the sampling rate, the inventive averaging filter relies on using the automatic gain control (agc) signal produced by the localizer receiver. This magnitude of the agc signal tracks any increase in received signal strength. In particular, the agc voltage produced by the localizer receiver is applied, via lead 95, as one input to amplifier 200. A reference level produced by potentiometer 203 is applied as another input to this amplifier. This potentiometer is adjusted as noted above. Any increase in the magnitude of the receiver agc voltage will correspondingly increase the level of the analog input voltage applied to VCO 210 and thereby increase its output frequency. The value of resistor 201 is selected to set amplifier 200 to have a desired amount of gain, i.e. sensitivity, to changes in receiver agc voltage.

Empirical observations have confirmed that, in general, multipath errors occur with a more rapid period, often two seconds or less, than do the true course changes occurring in the course deviation voltage. During actual testing of the inventive digital averaging filter, insertion of the filter between the outputs of a localizer receiver and a CDI, in the manner discussed above, advantageously reduced these multipath errors as indicated on a CDI to essentially zero.

Clearly, those skilled in the art realize that although the inventive filter has been described in terms of hard-wired digital logic, i.e. circuitry employing gates and discrete counters, the inventive filter could be readily implemented using a micro-processor. Through such an implementation, the filtering, amplifying, counting and averaging operations could be readily coded in appropriate software. Ideally, such a micro-processor could advantageously include on-board A/D and D/A converters and sufficient memory (both read only and random access) to enable the entire filter to be implemented with very few integrated circuits.

Although a single embodiment of the present invention has been shown and described herein, those skilled in the art will clearly realize by now that many varied embodiments may be constructed which incorporate the teachings of the present invention.

I claim:

1. Apparatus for a filter, adapted for use in conjunction with an aeronautical navigation receiver and operative in response to a zero centered course deviation voltage, for reducing oscillatory error components present in said course deviation voltage, said apparatus comprising:

means for sampling said course deviation voltage to yield corresponding digital signal representations thereof:

means, operative in response to said digital signal representations, for converting each of said digital signal representations into a corresponding series of pulses, wherein the number of pulses in said series is defined by the value of said digital representation;

means, responsive to said pulse series, for accumulating the total number of individual pulses in every one of said pulse series that occurs during a pre-defined period of time in order to produce a totalized value;

means for calculating an average value in response to said totalized value when said pre-defined time period has elapsed and for applying said average value to converting means;

means for converting said average value to a form suitable for display on a course deviation meter, wherein said average value is substantially free of said oscillatory error components; and means, connected to said calculating means and said accumulating means for resetting said average value and said totalized values to respective first and second pre-defined values after said average value has been applied to said converting means.

2. The apparatus of claim 1 wherein said calculating means comprises means for dividing the totalized value by a pre-defined number to yield the average value, wherein the average value equals the average number of pulses occurring in said every one of said series during said period.

3. The apparatus of claim 2 wherein said digital signal to pulse series converting means comprises:

a first binary counter that is loaded with the value of said digital signal representation and is thereafter continuously decremented by a source of gated clock pulses until the contents of said counter reach zero; and gating means, responsive to the contents of said counter and to a source of clock pulses, for producing said gated clock pulses as long as the contents of said counter are greater than zero, wherein the gated clock pulses applied to said counter from said corresponding pulse series and wherein the number of individual pulses that form said corresponding series is equivalent to the value of said digital signal representation.

4. The apparatus of claim 3 wherein said accumulating means comprises a second binary counter.

5. The apparatus of claim 4 wherein said calculating means further comprises a third binary counter having an output that is read in parallel when the pre-defined period has elapsed.

6. Apparatus for a filter, adapted for use in conjunction with an aeronautical navigation receiver and operative in response to a zero centered course deviation voltage, for reducing oscillatory error components present in said course deviation voltage, said apparatus comprising:

means for sampling said course deviation voltage to yield corresponding digital signal representations thereof;

means, operative in response to said digital signal representations, for converting each of said digital signal representations into a corresponding series of pulses, wherein the number of pulses in said series is defined by the value of said digital representation; and means, responsive to said pulse series, for accumulating the total number of individual pulses in every one of said pulse series that occurs during a pre-defined period of time in order to produce a totalized value;

means for dividing the totalized value by a pre-defined number to generate an average value which equals the average number of pulses occurring in said every one of said series during said time period and for applying said average value to converting means;

means for converting said average value to a form suitable for display on a course deviation meter, wherein said average value is substantially free of said oscillatory error components; and means for resetting both said average value to a first pre-defined value and said totalized value to a second pre-defined value after said average value has been applied to said converting means.

7. The apparatus of claim 6 wherein said digital signal to pulse series converting means comprises:

a first binary counter that is loaded with the value of said digital signal representation and thereafter is continuously decremented by a source of gated clock pulses until the contents of said counter reach zero; and gating means, responsive to the contents of said counter and to a source of clock pulses, for producing said gated clock pulses as long as the contents of said counter are greater than zero, wherein the gated clock pulses applied to said counter form said corresponding pulse series such that the number of individual pulses that form said corresponding pulse series is equivalent to the value of said digital signal representation.

8. The apparatus of claim 7 wherein said accumulating means comprises a second binary counter.

9. The apparatus of claim 8 wherein said calculating means further comprises a third binary counter having an output that is read in parallel when the pre-defined period has elapsed.

10. Apparatus for a filter, adapted for use in conjunction with an aeronautical navigation receiver and operative in response to a zero centered course deviation voltage, for reducing oscillatory error components present in said course deviation voltage, said apparatus comprising:

means for sampling said course deviation voltage to yield corresponding digital signal representations thereof;

a first binary counter that is loaded with the value of said digital signal representation and is continuously decremented by a source of gated clock pulses until the contents of said counter reach zero; and gating means, responsive to the contents of said counter and to a source of clock pulses, for producing said gated clock pulses as long as the contents of said counter are greater than zero, wherein the gated clock pulses applied to said counter form a series of pulses such that the number of individual pulses that form said series is equivalent to the value of said digital signal representation; and means, responsive to said pulse series, for accumulating the total number of individual pulses in every one of said pulse series that occurs during a pre-defined period of time in order to produce a totalized value;

means for dividing the totalized value by a pre-defined number to yield the average value, wherein the average value equals the average number of pulses occurring in said every one of said series during said time period, and for applying said average value to said converting means; and means for converting said average value to a form suitable for display on a course deviation meter, wherein said average value is substantially free of said oscillatory error components; and means for resetting both said average value to a first pre-defined value and said totalized value to a second pre-defined value after said average value has been applied to said converting means.

11. The apparatus of claim 5 wherein said second and third binary counters are both reset to zero after the output of said third binary counter has been read.

12. The apparatus of claim 9 wherein said second and third binary counters are both reset to zero after the output of said third binary counter has been read.

13. The apparartus of claim 10 wherein said accumulating means comprises a second binary counter.

14. The apparatus of claim 11 wherein said dividing means comprises a third binary counter having an output that is read in parallel when the pre-defined period has elapsed.

15. The apparatus of claim 12 wherein said second and third binary counters are both reset to zero after the output of said third binary counter has been read.

16. The apparatus in claim 1 wherein said apparatus further comprises means, connected to said sampling means and said accumulating means, for varying the length of said pre-defined time interval in response to the strength of a received incoming radio navigation signal.

17. The apparatus in claim 6 wherein said apparatus further comprises means, connected to said sampling means and said accumulating means, for varying the length of said pre-defined time interval in response to the strength of a received incoming radio navigation signal.

18. The apparatus in claim 10 wherein said apparatus further comprises means, connected to said sampling means and said accumulating means, for varying the length of said pre-defined time interval in response to the strength of a received incoming radio navigation signal.

* * * * *